United States Patent [19]

Moir

[11] Patent Number: 4,747,196

[45] Date of Patent: May 31, 1988

[54] CLARIFIER

[75] Inventor: John G. Moir, Johannesburg, South Africa

[73] Assignee: Envirotech (Proprietary) Limited, Isando, South Africa

[21] Appl. No.: 913,353

[22] Filed: Sep. 30, 1986

[30] Foreign Application Priority Data

Oct. 2, 1985 [ZA] South Africa .................. 85/7608

[51] Int. Cl.[4] .................. E01D 43/00

[52] U.S. Cl. .................. 29/163.5 F; 210/521; 210/522

[58] Field of Search .................. 210/521, 522, 800, 801, 210/802; 29/163.5 F

[56] References Cited

U.S. PATENT DOCUMENTS

| | | | |
|---|---|---|---|
| 2,570,304 | 10/1951 | Bach | 210/55 |
| 3,687,298 | 8/1972 | Rozkydalek | 210/519 |
| 3,718,257 | 2/1973 | Bach | 210/73 |
| 3,754,656 | 8/1973 | Horiguchi | 210/221 |
| 3,951,818 | 4/1976 | Bosnjak | 210/522 |
| 4,151,084 | 4/1979 | Probstein | 210/97 |
| 4,544,487 | 10/1985 | Bosnjak | 210/522 |

FOREIGN PATENT DOCUMENTS

| | | |
|---|---|---|
| 867838 | 6/1978 | Belgium . |
| 1246676 | 8/1967 | Fed. Rep. of Germany . |
| 2052640 | 5/1971 | Fed. Rep. of Germany . |
| 1255545 | 1/1961 | France . |

*Primary Examiner*—Frank Sever

*Attorney, Agent, or Firm*—Trask, Britt & Rossa

[57] ABSTRACT

A clarifier composed of a plurality of upright supports, perforated pipes and angulated flow directioning members is disclosed. The supports, pipes and directioning members are adapted for detachable association to form a clarifier which avoids short circuiting of the flow path. The various components of the clarifier, being integer and subject to detachable association, provide a clarifier system which may be transported through and installed in environments which are spatially restricted.

22 Claims, 8 Drawing Sheets

CLARIFIER

BACKGROUND OF INVENTION

1. Field

This invention relates to apparatus and methods for separating a carrier fluid from solids suspended within that fluid. More particularly, the invention is directed to apparatus and methods of processing which utilize gravity to effectuate a liquid/solids separation.

2. State of the art

Various clarifier systems for use in separating carrier fluids from suspended solids are well known in the art. These systems typically include a vessel having an inlet and an outlet. The inlet and outlet are positioned to establish a flow path for a stream of fluid mixture introduced into the vessel. A separation unit is oriented within that flow path to intercept the stream of mixture and separate the carrier fluid from the solids suspended within the fluid. The carrier fluid is thereafter channeled off into one receiving area while the solids are directed to another.

U.S. Pat. No. 3,951,818 (Bosnjak) discloses a clarifier of the gravity separation type. Simply stated, this clarifier includes a vertical upright channel defined by a pair of separation elements. Each of the separation elements includes a vertical plate which is intersected at spaced intervals along its height by outwardly extending flow directioning plates. The directioning plates intersect the vertical plate at an acute angle; ie. the directioning plates are not arranged parallel to a horizontal plane.

The vertical plates each define a predetermined plurality of sized orifi, positioned proximate each intersection of the vertical plate with a flow directioning plate; ie. proximate an apex. Each of the orifi communicates with the vertical channel thereby establishing a pathway from the body of fluid mixture to the vertical channel.

The Bosnjak separation elements are suspended within a receiving vessel by two upright supports which are spacedly positioned one from another. The supports include a plurality of outwardly extending rods. The apex of each separation element, as formed by the intersection of the vertical plate with a directioning plate, is placed over a respective support rod and thereafter held in position by the action of the rod against the respective apex.

In operation, clarifiers of the kind typified by the Bosnjak structure have experienced difficulty in operation. Conventionally, the vertical plates have not been held in a sealed relationship with upright supports. These upright supports form the sides of the respective compartments defined by the association of the vertical plate, directioning plates and supports. As a result of the unsealed relationship, short circuiting of the separation process occurs. Specifically, unclarified mixture may bypass the gravity separation action of the compartments by flowing around the vertical plates directly to the vertical channel. This short circuiting action results in the clarified carrier fluid being contaminated by an infusion of unclarified fluid mixture. This contamination imposes a practical limitation on the separation efficiency of the clarifier; ie. on the concentration of clarified carrier fluid obtainable.

The requirement of a vertical channel makes clarifiers of the Bosnjak construction relatively large spatially. Considering that clarifiers may be installed in spatially restricted environments, such as in mines, the spatial requirements of this clarifier construction may prove disadvantageous.

U.S. Pat. No. 4,544,487 (Bosnjak) discloses a clarifier system composed of back-to-back positioned separation elements. Each element includes a vertical plate intersected at spaced intervals by outwardly extending flow directional plates similar to those disclosed in U.S. Pat. No. 3,951,818. The vertical plate and flow directioning plates form a series of apexes similar to the construction described above. The later structure differs from the former in that the apexes include a curved wall which substantially confines the area extant between each intersection of the vertical plate and a directioning plate thereby forming an open-ended horizontally oriented pipe. This horizontal channel functionally substitutes for the vertical channel of the former construction as a means of withdrawing clarified carrier fluid from the clarifier. As shown in FIG. 6B of U.S. Pat. No. 4,544,487, the vertical plate/flow directioning plates assembly appears to be fixedly mounted on the side supports to form a fully integrated separation unit.

While clarifier configurations of the type disclosed in U.S. Pat. No. 4,544,487 remedy the short circuiting complications of prior clarifiers and reduce somewhat the clarifier's spatial requirements, such clarifiers engender a different problem. Specifically, clarifiers must often be installed in spatially confined environments. Often, the access way to the installation site is sufficiently narrow that clarifier components having dimensions, such as those of the separation units described in U.S. Pat. No. 4,544,487, may not pass through that access way. Resultingly, the user must disassemble or remove preexisting structure to permit the passage of the clarifier components.

In view of the disclosed clarifiers, there exists a need for a clarifier system which circumvents the possibility of the fluid mixture short circuiting the clarifier process. Further, this clarifier should be suitable for conveyance through spatially restricted access ways as well as be adapted for installation in spatially confined environments.

SUMMARY OF THE INVENTION

A clarifier constructed according to the instant invention includes a vessel having an inlet and outlet. The inlet and outlet are oriented to establish a flow path therebetween for a fluid mixture composed of a carrier fluid having suspended solids therein. Positioned and supported within the vessel, and oriented to intercept that flow path, is a separator unit. This separator unit includes an assembly of integral carrier tubes and flow deflector plates having a support system adapted to retain those tubes and plates in a predetermined spatial relationship. A fluid conveyance system is associated with the separator unit for draining off clarified carrier fluid.

The separator unit includes a pair of spaced upright supports, which may be oriented substantially parallel one another.

A plurality of fluid carrying pipes are releasably secured to each of the supports whereby each pipe extends from one support to the other. The pipes are preferably positioned one above another in a generally vertical orientation. Each of the pipes may have orifi therein positioned along its length which communicate with a hollow interior channel within the pipe. Each pipe also includes at least one open end or port which communicates with the pipe's interior channel. At least one upright support defines openings at spaced intervals along its length to coincide with the open ends or ports of the pipes whereby fluid contained within the interior channel may be drained from that channel through the support.

A flow directing member having a "V" or "U"-shaped configuration is preferably associated with each of the fluid carrying pipes. Each member may be inverted and positioned atop a respective carrying pipe to rest thereon. A flow directing member may be positioned between each pair of adjacent pipes. Preferably, each flow directing member has an inverted "V"-shape. The top of each pipe, ie. its outer surface, may be formed by two planar, angled surfaces which are configured to form a suitable mounting for a respective flow directing member. The mounting may correspond in shape to the configuration of the downward facing surface of the flow directing member. In some embodiments, each carrying pipe may actually be fixedly mounted to a flow directing member positioned atop that carrying pipe. It should be understood that the orifi in the carrying pipes are arranged in those regions of the pipes that are not covered by the flow directing members.

Each of the pipes are secured to the supports in a manner permitting their manual detachment therefrom. Further, the pipes are adapted to form a substantially sealed relationship with the support whereby access to the interior channel of each pipe is substantially restricted to the orifi and to the open ends of the pipes, which are held in a sealed relationship with the upright supports. The open ends of the pipe communicate through the support openings with a clarified carrier fluid receiving means which is positioned proximate the support. The receiving means does not communicate with the fluid mixture within the vessel except through the carrying pipes and their associated orifi.

In preferred constructions, the pipes may be secured to the upright supports in a slide and slide-way manner. Thus, the uprights and the ends of the pipes may define complementary inter-engaging formations that fit together in a sliding manner. In some constructions, each upright may define a lipped channel. Each pipe may be fitted with a flange on each end, configured to be slidably received within the upright channels.

In a preferred embodiment, the uprights are extruded with a suitable profile. They may have a body web with the lipped channel for the pipes on one side. On the opposing side of the body web a set of attaching formations may be provided, whereby a riser defining component may be attached to the upright. A set of coupling formations may also be provided on the opposing side of the body web. The coupling formations may provide a means whereby two uprights may be coupled together, adjacent one another by a suitable member.

The flanges of the pipes may be formed from rectangular or square pieces which define openings therein. The ends of the pipes are received within the flanges such that the openings in the flanges communicate with the interior channels of the pipes. These pieces may be fastened to the pipes in a suitable manner, such as by means of an adhesive.

Those skilled in the art will appreciate that the openings in the uprights should vary in size from one end of the upright to the other. To achieve this, a separate element having graded apertures may be engaged with each upright support. The apertures are oriented to register with the upright support openings. Preferably, all of the openings within the support are of the same size. Conveniently, the coupling formations may also be used for this purpose, so that two arrays may be coupled together at one end and each may have a riser with an apertured element at its other end.

The association of the carrying pipes, upright supports and flow directing members form a plurality of open-sided compartments. Each compartment is defined by a top and bottom formed by the surfaces of adjacently positioned flow directing members. An exterior surface of the carrying pipe defines the back wall of the compartment. The sidewalls of the compartment are formed by the portions of the upright supports which extend between the described flow directing members. The front of the compartment remains open thereby permitting the introduction of fluid mixture into the compartment.

The fluid mixture is driven into each compartment due to the effects of hydrostatic pressure operating on the mixture. Due to the angulated orientation of the flow directing members, fluid mixture entering the compartment is driven upwards. Since the fluid is driven at a relatively low velocity and typically under laminar flow conditions, solids suspended within the mixture begin to settle out of the mixture due to the effects of gravity. As the mixture progresses through the compartment, the concentration of solids within the mixture decreases.

Upon the mixture reaching the carrying pipe which forms the back wall of the compartment, the mixture is substantially composed solely of carrier fluid, ie. little if any solids remain within the mixture. At this juncture, the carrier fluid enters the orifi and is channeled through the pipe interior to receiving means positioned proximate the upright supports. The solids, which settle to the bottom of the compartment, are drained from the compartment through the open front and eventually drained from the vessel.

The invention extends to a clarifier which has at least one stacked (preferably vertical) array in accordance with the invention.

The invention provides a stacked array which may easily be assembled on site. The array is composed of integers that are easily transportable, even down into a mine. Not only is it easier to transport the integers than an assembled array or stack, but furthermore, the integers permit the array to be transported through and installed in environments which are spatially restricted.

BRIEF DESCRIPTION OF THE DRAWINGS

The invention is now described by way of an example, with reference to the accompanying drawings, in which.

DESCRIPTION OF THE ILLUSTRATED EMBODIMENT

Figure 1:
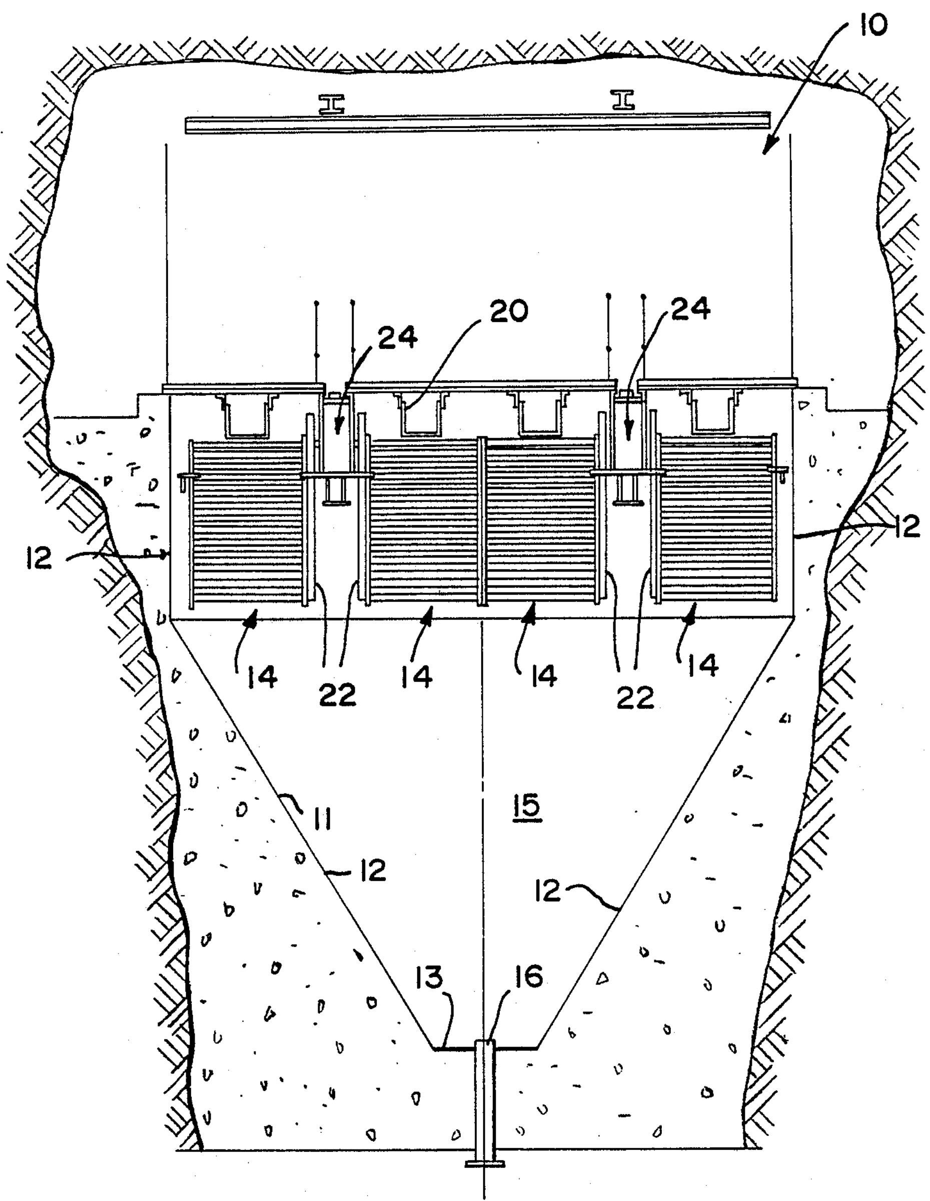
FIG. 1 shows a schematic view of a clarifier in accordance with the invention, which is located underground in a mine.
Figure 2:
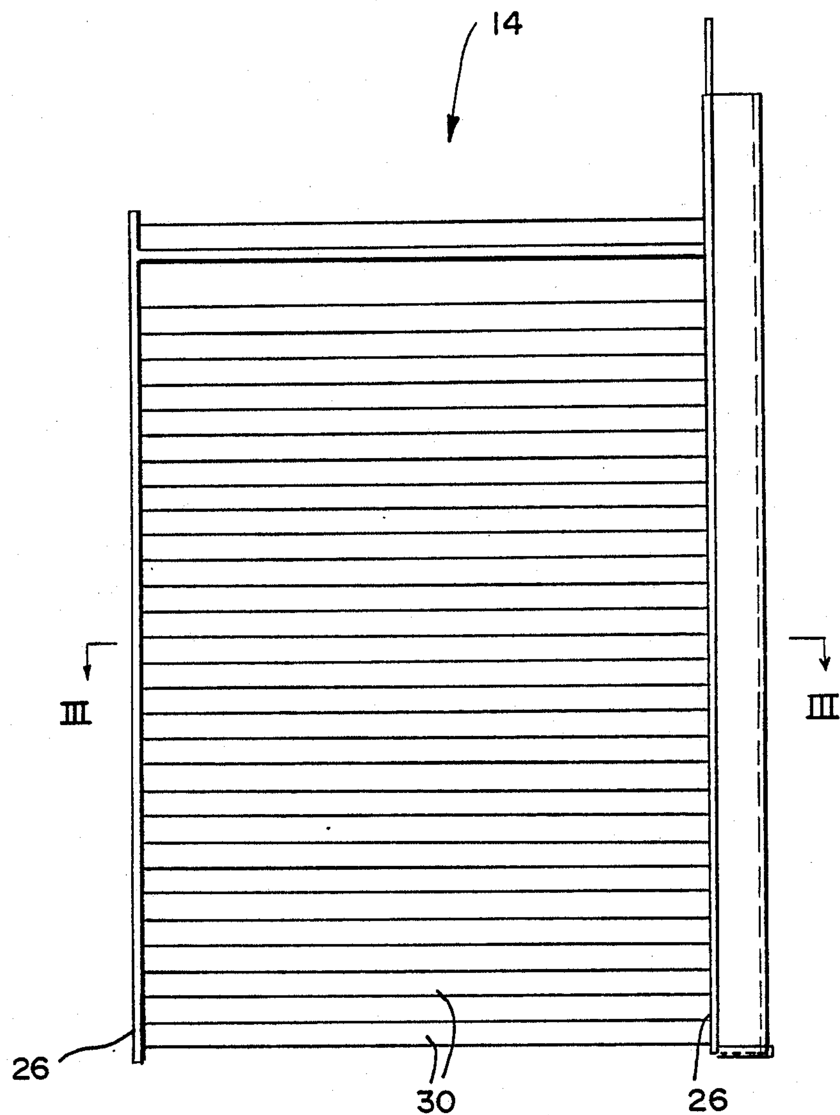
FIG. 2 shows a schematic side view of one of the separation units forming part of the clarifier of FIG. 1.
Figure 3:
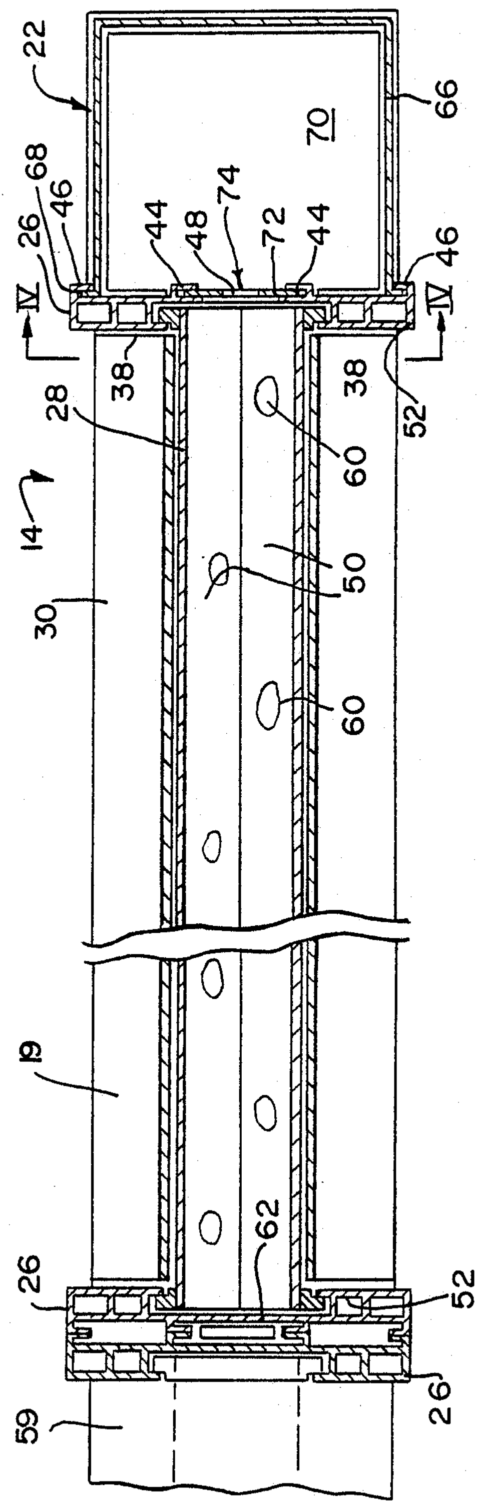
FIG. 3 shows a sectioned view along line III—III in FIG. 2.

Referring to FIG. 1, a clarifier for use in clarifying water in a mine is designated generally by reference numeral 10. Clarifier 10 includes a vessel 11 defined by a plurality of upstanding walls 12 and a bottom 13. The association of walls 12 and bottom 13 constitute a receptacle suited for retaining a fluid mixture, generally 15. Vessel 11 includes a drain 16 positioned within the bottom 13.

The clarifier 10 has four stacks or separation units 14, through which clear water passes. Water to be clarified is supplied via feed launders 20. Clear water passes into the stacks and exits via risers 22 and discharge launders 24.

Figure 5:
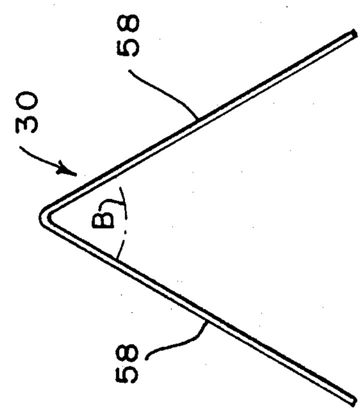
FIG. 5 shows an end view of a flow directing member utilised to form the separation unit.
Figure 6:
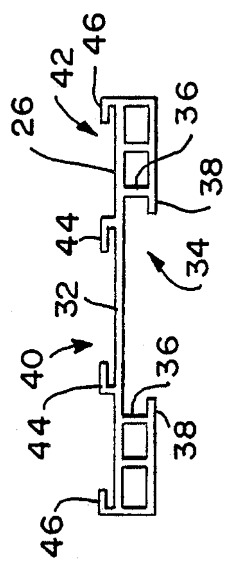
FIG. 6 shows an end view of an upright utilised to form a stack.
Figure 4:
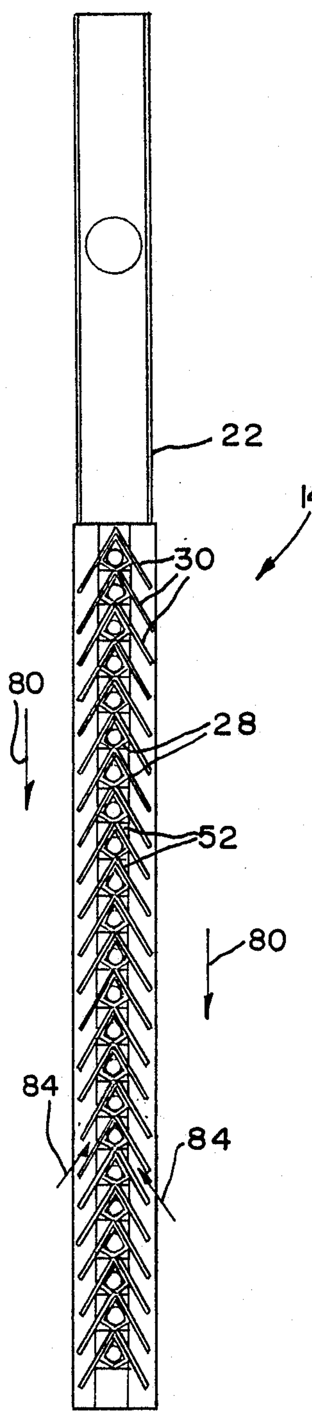
FIG. 4 shows a sectioned view along line IV—IV in FIG. 3.
Figure 8:
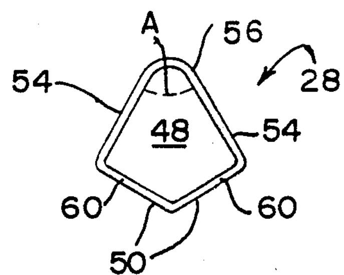
FIG. 8 shows an end view of a pipe utilized to form the separation unit.
Figure 10:
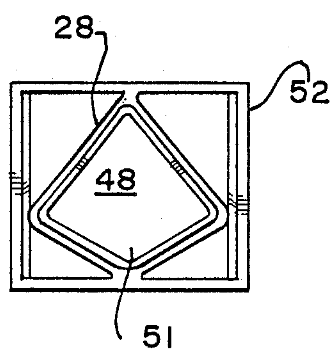
FIG. 10 is an end view of the pipe shown in FIG. 9.
Figure 7:
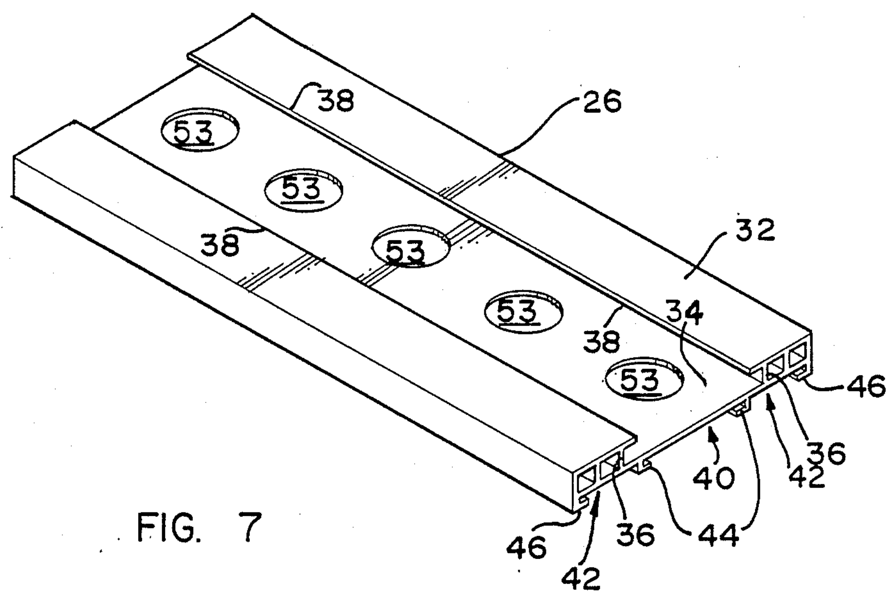
FIG. 7 is an elevated perspective view of the upright shown in FIG. 6.
Figure 9:
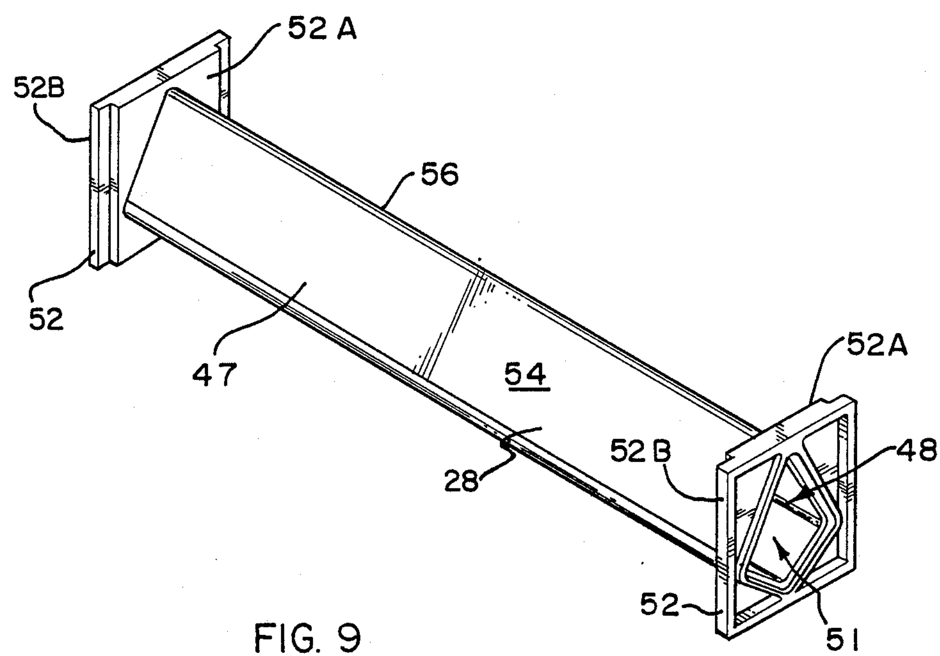
FIG. 9 is an elevated perspective view of the fluid carrying pipe shown in FIG. 8 having its end flanges in position.
Figure 11:
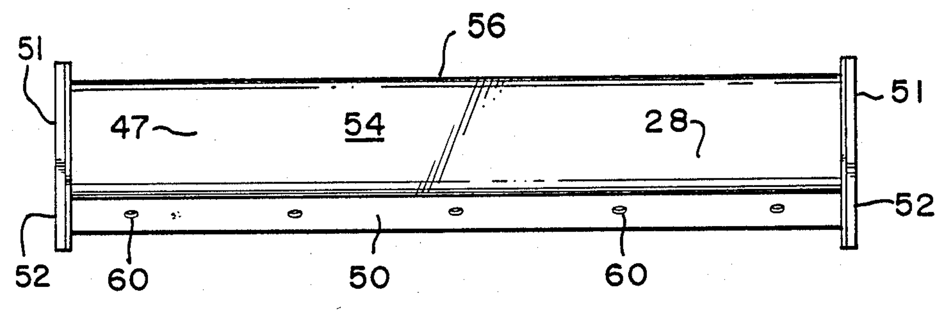
FIG. 11 is a side view of the pipe shown in FIG. 9.
Figure 12:
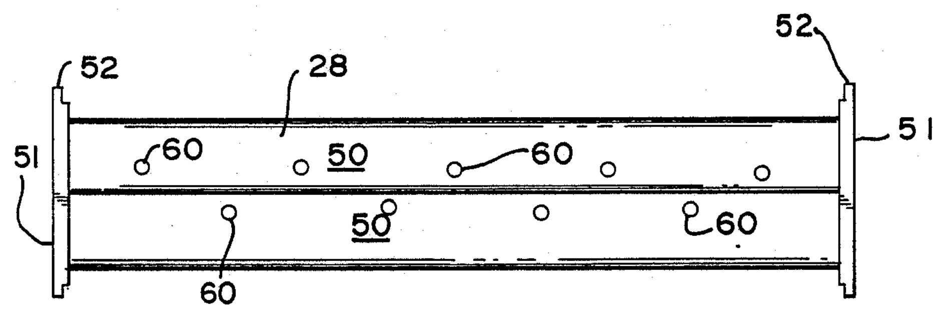
FIG. 12 is a bottom view of the pipe shown in FIG. 9.
Figure 13:
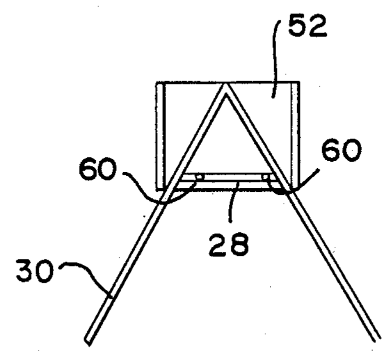
FIG. 13 is an end view of an alternative embodiment of a fluid carrying pipe of this invention.
Figure 14:
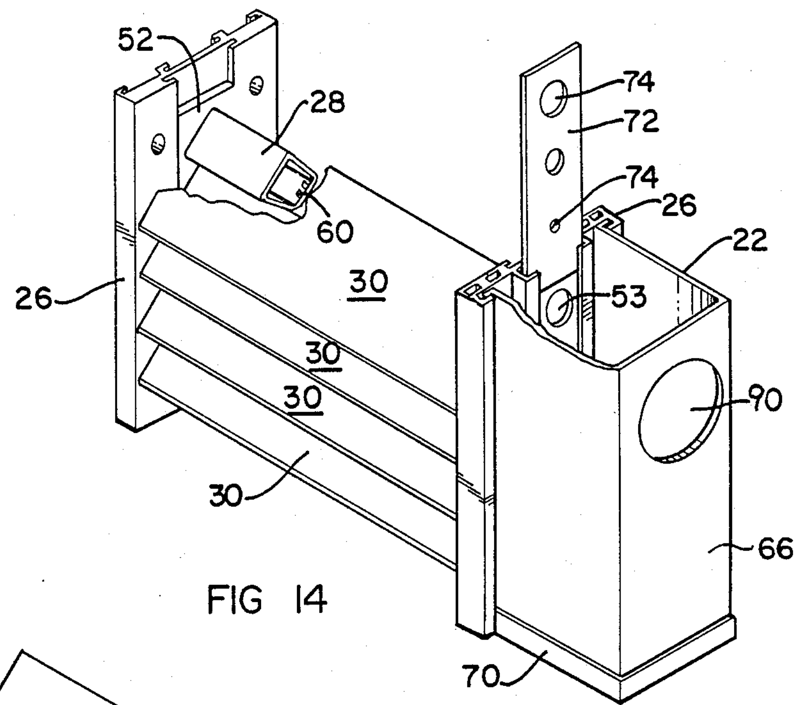
FIG. 14 is an elevated perspective view of the separation unit of the instant invention.

Referring now to FIG. 2 through 4 and 9 through 14, the stack 14 is shown in more detail. The stack 14 is formed primarily from two uprights 26, a number of pipes 28 and an equal number of inverted "V"-shaped flow directing members 30. The uprights 26, the pipes 28 and the members 30 are all extruded and are of a suitable synthetic plastics material. The profiles of the uprights 26, the pipes 28 and the members 30 are shown in FIGS. 6, 7 and 5 respectively. Thus, the uprights 26 have a planar body web 32 which on one side has a slideway defined by a lipped channel 34 which has sidewalls 36 and lips 38 extending along the complete length of upright 26. On its other, ie. opposing, side, the upright 26 has two further slideways 40 and 42. The slideway 40 is defined by lips 44 and the slideway 42 by lips 46. Lips 44 and 46 also extend along the complete length of upright 26. A number of openings 53 are formed in some of the uprights 26 at spaced intervals along the length of these uprights. The purpose thereof will be explained below.

Each of the pipes 28 includes a sidewall 47 which defines a hollow interior cavity or channel 49. Each pipe 28 includes an access opening or port 51 at each end thereof which communicates with channel 48. The pipes 28 are substantially diamond-shaped in cross section. Further, each of the pipes 28 may be viewed as being formed by the association of two elongated planar sections 50 and two further elongated planar sections 54. The sections 50 are shorter in width than the sections 54. Sections 50 intersect one another at an angle designated generally A. As shown in FIG. 7, the exterior surface of the intersection 56 of sections 50 may be rounded.

The members 30 have two planar pieces 58 that define an angle B therebetween. Angle A and angle B are generally equivalent in degree measure. Planar pipes 58 meet in a rounded region which has the same radius of curvature as the rounded region 56 so that the members 30 are snugly received on the sections 54 of the pipes 28. However, the pieces 58 are about twice as wide as the sections 54 so that the members 30 extend substantially beyond the pipes 28.

A number of holes 60 are formed in the sections 50. Holes 60 communicate with the interior channel 48 of the pipe 28. The pipes 28 are cut to length and square plates 52 having openings in them complementary in shape to the pipes 28 are adhesively secured to the ends of pipes 28.

Figure 15:
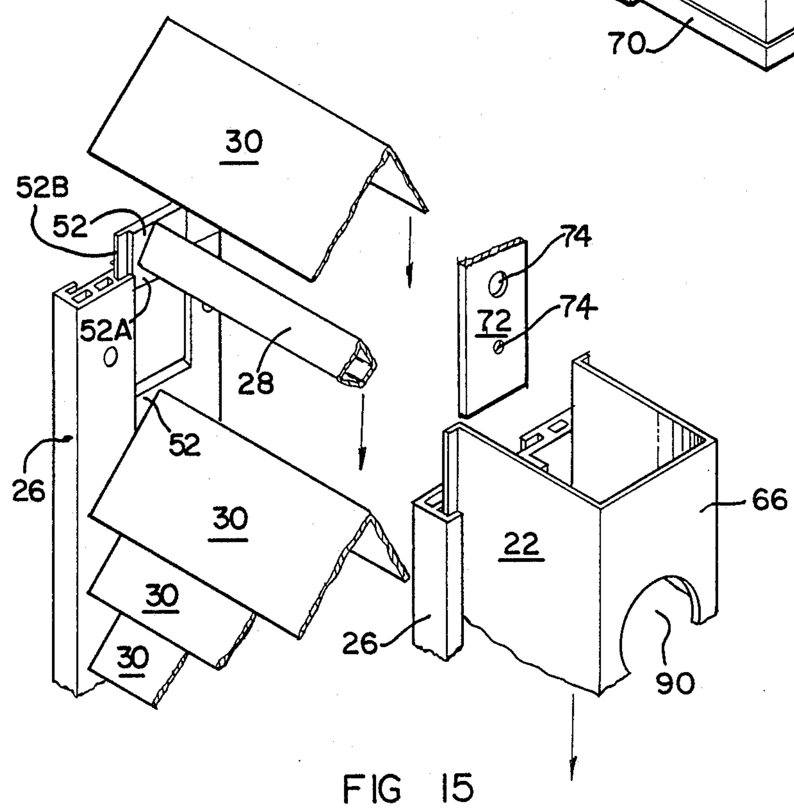
FIG. 15 is an exploded view of the separation unit illustrated in FIG. 14.

As shown in FIG. 15, plates 52 may be composed of two square plates of varying dimensions. A first plate 52A is configured to abut snugly against lips 38, while a second plate 52B is dimensioned to snugly abut against sidewalls 36. As each respective plate 52 is slidably inserted into channel 34, adjacent plates 52 abut one against another thereby sealing the channel 34 from fluid mixture entering that channel 34 from the side of upright 26 proximate separation unit 11. The members 30 are cut from lengths thereof to be slightly shorter than the pipes 28.

The separation unit 14 is assembled by sliding one end of a first pipe 28 into the slideway 34 of a first upright which has the openings 53 and the other end into the slideway 34 of a second upright 26 that does not have the openings 53. A member 30 is then placed on top of the pipe 28. A further pipe 28 is then slid along the slideway 34 until it engages and abuts against the member 30, a further member 30 is placed on pipe 28 and the process is repeated until the uprights 26 have been filled. It will be appreciated that the openings 53 are located in suitable locations so that they are aligned with the open ports 51 of pipes 28.

Two separation units (such as 14 and 59) can be coupled together in a back-to-back manner by means of a coupling 62 which is engaged in the slideway 44 of two adjacent uprights 26 that do not have openings 53 in them. However, even if they do have openings 53 in them, these openings are closed off if a coupling 62 equal in length to the uprights 26 is used.

The risers 22 are formed from trough-like components 66 which have flanges 68 that engage the lips 46 defining the slideway 42. The bottom of the riser 22 defined by the components 66 is closed off by a cap 70.

Riser 22 provides for the transfer of carrier fluid from the pipes 28 outward through vessel wall 74 to a suitable receiving means (not shown).

Figure 16:
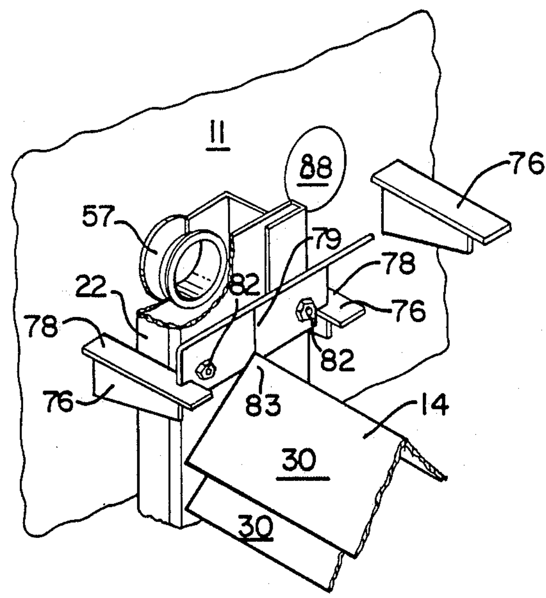
FIG. 16 is a partial view of a mounting of a separation unit of this invention on a clarifier vessel.
Figure 17:
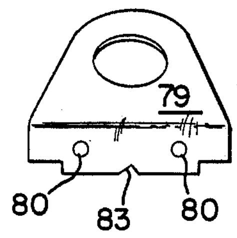
FIG. 17 is an elevated perspective view of a retaining member of the instant invention.
Figure 18:
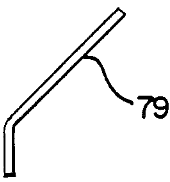
FIG. 18 is a side view of the retaining member shown in FIG. 17.
Figure 19:
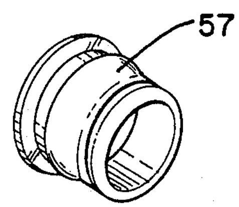
FIG. 19 is an elevated perspective view of a fluid transferring nozzle of the instant invention.

As shown in FIG. 16, a separation unit 14 of the instant invention may be mounted within a vessel 11 by means of a plurality of support brackets 76. Each bracket 76 is oriented to extend into the interior of vessel 11 and provide a mounting platform 78. A mounting bracket 79, having a length which dimensionally exceeds the distance separating two adjacent brackets 76 rests on the platform 78. Mounting bracket 79 includes an attachment means for securing the bracket 79 to a separation unit 14. As shown in FIG. 16, this attachment means may include the provision of bolt holes 80 within the bracket sized to receive bolts 82, which are mechanically connected to the separation unit 14 forming a union of the bracket 79 and separation unit 14. The bracket 79 is then positioned to straddle two adjacent brackets 76 and thereby support the separation unit 14 from the wall of vessel 11. A similar procedure on the opposing end of the separation unit provides a support means on each end of the separation unit 14. As shown in FIG. 16, bracket 79 may also be fitted with a notch 83 which is configured to receive the top portion of the uppermost directing plate 30. The bracket 79 thereby also operates to retain the pipes 28 and directing plates in a fixed relationship. Fluid within riser 22 is withdrawn through a nozzle 57 which passes through an aperture 88 in the wall of vessel 11. The nozzle 57 is received in an outlet hole 90 in the component 66.

It will be appreciated that the pipes 20 of the separation unit 14 should not communicate with the riser 22 through equal openings. Thus, a flat strip 72 is provided which is slidably received in a slideway 40, and which has a series of graduated apertures 74 which align with the openings 53.

Accordingly, it will be understood that the constituent integers of a separator unit for a clarifier may be easily transported to the place where the clarifier is to be located and the separator may be easily assembled on site with relatively unskilled labour.

The physics operable in the separation process effected by the instant apparatus is well known in the art. See U.S. Pat. No. 4,544,487 (Bosnjak), Cols. 7 and 8.

The association of the directioning plates, upright supports and carrying pipes defines a plurality of vertically disposed, open-sided compartments. In use, the compartments are positioned adjacent a flow stream of mixture 80 thereby facilitating an introduction of that mixture into the various compartments through the open side or ingress.

As the fluid mixture enters each compartment, the mixture is directed by hydrostatic pressure upward (indicated by arrow 84) toward the orifi 60. Due to the relatively low velocity of the mixture, differences in densities between the carrier fluid and solids suspended therein and the structure of the compartments, the force of gravity effects a separation of the carrier fluid from the solids. Specifically, the solids typically settle out of the fluid mixture before the fluid mixture reaches the orifi. In contrast, the carrier fluid typically reaches the orifi and is withdrawn from the clarifier through the vertical channel.

Those skilled in the art will recognise that the embodiments hereinbefore discussed are illustrative of the general principles of the invention. The embodiments herein described are not intended to limit the scope of the claims, which themselves recite what applicant regards as his invention.

I claim:

1. A clarifier for use in a vessel having an inlet and an outlet for receiving a stream of mixture of carrier fluid and solids suspended therein, said vessel defining a flow path between said inlet and said outlet, said clarifier comprising:

a pair of supports mounted upright within said vessel and spaced apart from each other, each of said supports having a channel therein which extends along a height of said support;

a plurality of integral carrier pipes, each of said carrier pipes possessing a sidewall and two opposing ends, said sidewall defining a hollow interior cavity and at least one orifice which communicates with said interior cavity, each of said opposing ends having a flange which is slidably receivable within said channel whereby each of said carrier pipes is mounted on said supports to extend from one support to the other and wherein said carrier pipes are slidably removable from said supports;

a plurality of integral "V"-shaped flow directing members, one of said members being detachably placed atop each of said carrier pipes to rest thereon, such that an apex of each said "V"-shaped flow directing member is directed upwards, wherein an association of said carrier pipes, said directing members and said supports forming a vertical stacked array of settling compartments, each of which is in communication with said mixture flow path through an entry way, each of said compartments being adapted to receive a quantity of said mixture containing a carrier fluid and solids suspended within said carrier fluid whereby said carrier fluid is received through said pipe orifice under clarified conditions, whereas said solids settle toward one of said flow directing members eventually being discharged from said compartment through said entry way;

means of withdrawing said clarified carrier fluid from said carrying pipes;

wherein said clarifier further includes means for enabling disassembly into its separate components namely said supports, said carrier pipes and said flow directing members; said supports, said carrier pipes and said directing members being dimensioned and configured to be transportable through spatially restricted environments, and for enabling said clarifier to be transported through and thereafter be installed in spatially confined environments.

2. The clarifier of claim 1 wherein each of said compartments is defined by two sidewalls formed by said upright supports, a back wall formed by said carrying pipe, and a top and bottom formed by a pair of adjacent flow directing members.

3. The clarifier of claim 2 wherein said entry way is defined by an association of edges of said adjacent flow directing members and said upright supports.

4. The clarifier of claim 1 wherein each said carrying pipe interior cavity is inaccessible to said fluid mixture except through said orifi.

5. The clarifier of claim 4 wherein said support channels and said carrying pipe flanges are configured to form a sealed union whereby said fluid mixture may access said carrying pipe cavity solely through said orifi.

6. The clarifier of claim 1 wherein said means of withdrawing clarifier carrier fluid from said carrying pipes comprises a plurality of openings within said upright supports, each of said openings being positioned to correspond with a positioning of an open end of a carrying pipe, said openings directing fluid from said interior carrying pipe cavities to a receiving means for containing said clarified fluid.

7. A clarifier comprising:

a plurality of integral pipes having a sidewall defining a hollow cavity therein, said cavity made accessible through an open end of said pipe and a plurality of orifi defined within said sidewall;

a plurality of integral "V"-shaped flow directing members, each said member defining an apex, one of said members being detachably placed atop each of said pipes; wherein said apex is directed upwards, a pair of upstanding supports positioned spacedly from one another, each of said supports having attachment means for retaining said pipes in association with said supports in a vertically oriented array, whereby said pipes extend from one support to the other, said supports being positionable in communication with a stream of mixture composed of carrier fluid and solids suspended therein, wherein an association of said pipes, flow directing members and supports constitute an array of compartments for receiving said mixture and directing said carrier fluid through said pipe orifi while said solids settle against said flow directing members, each pair of adjacent flow directing members, in association with said side supports defining a respective pair of compartments, one of said compartments of said pair of compartments being positioned opposite its counterpart compartment about a pipe separating said pair of adjacent flow directing members;

means for enabling disassembly of the components of said clarifier sufficient to further enable transport and reassembly thereof in specially confined environments, wherein at least one support is adapted with means for communicating with said pipe cavities and withdrawing said carrier fluid from said cavities, said means comprising:

a plurality of openings within said support, each of said openings positioned in register with an open end of a carrying pipe, said openings communicating with a fluid receiving receptacle, wherein said support openings are fitted with a fluid control means for controlling fluid flow through said openings; said fluid control means comprising:

a plate having a plurality of apertures therein positioned contiguous said support, said apertures being graduated in configuration and positioned in register with said support openings.

8. The clarifier according to claim 7 wherein said supports are adapted with means for communicating with said pipe cavities and withdrawing said carrier fluid from said cavities.

9. The clarifier according to claim 8, in which each said support defines a passage through which the carrier fluid may be withdrawn.

10. The clarifier according to claim 7 wherein each of said flow directing members define top and bottom surfaces of adjacent compartments for receiving fluid mixture and wherein adjacent flow directing members define parallel surfaces mounted at an incline to the horizontal.

11. The clarifier according to claim 7, in which the sidewall of each pipe is partly defined by two first planar angled sections, and partly by a further wall portion, the orifi being in the further wall portion said two angled planar pieces forming a seat on which a respective flow directing member may be seated.

12. The clarifier according to claim 11, in which the further wall portion is also formed by two second planar sections that are angled to one another and to said first planar sections such that each said pipe has a substantially diamond shape in cross-section.

13. The clarifier according to claim 7, in which each said pipe and said supports are attached to one another in a slide and slideway manner.

14. The clarifier according to claim 7, in which the attachment means comprises a pair of spaced lip-defining formations.

15. The clarifier according to claim 7, in which at least one support has a coupling means for coupling it to another support.

16. A method comprising constructing a clarifier which includes assembling a stacked array of settling compartments by enabling disassembly of the components of said clarifier sufficient to further enable transport and reassembly thereof spatially confined environment by, providing a pair of uprights, a plurality of pipes each having a sidewall defining a hollow cavity therein that is accessible through an open end and a plurality of orifi defined in the sidewall, and a plurality of flow directing members;

securing a first pipe between the uprights;

placing a first flow directing member on the first pipe;

securing a second pipe between the uprights on the first flow directing member;

placing a second flow directing member on the second pipe; and successively securing further pipes and placing further flow directing members between said uprights one on top of another.

17. The method claimed in claim 16, in which one of said uprights has openings at spaced intervals and the pipes are secured to said upright with their respective open ends in register with said openings.

18. The method claimed in claim 17, in which a flow control plate having a series of graduated apertures is secured to the upright with openings, with the apertures in register with the openings and with the smallest aperture at the bottom and the largest at the top.

19. The method claimed in claim 16, in which the flow directing members are substantially "V"-shaped and they are placed on the pipes in an inverted manner with their apexes upwardly directed.

20. The method claimed in claim 19, in which the pipes have two planar angled sections and the pipes are arranged with said sections on top and the flow directing members are seated on said sections.

21. The method claimed in claim 16, in which the pipes are secured to the uprights by sliding flanges at the ends of the pipes along channels of the uprights.

22. The method claimed in claim 16, in which at least one of said uprights defines a flow passage and the ends of the pipes are secured to said upright in a sealed manner so that fluid may flow into the passage only through the pipes.

* * * * *